(12) United States Patent
Sharma et al.

(10) Patent No.: US 10,161,345 B2
(45) Date of Patent: Dec. 25, 2018

(54) CONTROL OF AIRFLOW IN A UNIFLOW-SCAVENGED, TWO-STROKE CYCLE, OPPOSED-PISTON ENGINE DURING TRANSIENT OPERATION

(71) Applicant: ACHATES POWER, INC., San Diego, CA (US)

(72) Inventors: Arunandan Sharma, San Diego, CA (US); Nishit Nagar, San Diego, CA (US); Suramya D. Naik, San Diego, CA (US); Daniel Schum, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 386 days.

(21) Appl. No.: 15/173,478

(22) Filed: Jun. 3, 2016

(65) Prior Publication Data

US 2017/0204801 A1 Jul. 20, 2017

Related U.S. Application Data

(60) Provisional application No. 62/279,301, filed on Jan. 15, 2016.

(51) Int. Cl.
*F02D 23/00* (2006.01)
*F02D 41/30* (2006.01)
(Continued)

(52) U.S. Cl.
CPC ............ *F02D 41/3064* (2013.01); *F01B 7/14* (2013.01); *F02B 25/08* (2013.01); *F02B 37/24* (2013.01); *F02B 75/02* (2013.01); *F02B 75/282* (2013.01); *F02D 13/0284* (2013.01); *F02D 41/0007* (2013.01); *F02D 41/10* (2013.01); *F02D 41/1458* (2013.01); *F02D 41/182* (2013.01); *F02D 41/2451* (2013.01);
(Continued)

(58) Field of Classification Search
CPC ......................... F02D 41/3064; F02D 41/0007
USPC ................................................. 60/602, 605.1
See application file for complete search history.

(56) References Cited

U.S. PATENT DOCUMENTS

| 3,015,934 A | 1/1962 | Miller .............................. 60/601 |
| 4,601,270 A | 7/1986 | Kimberley et al. .......... 123/657 |

(Continued)

FOREIGN PATENT DOCUMENTS

| DE | 10 2015 120741 A1 | 6/2016 |
| JP | H100238383 A | 9/1998 |

(Continued)

OTHER PUBLICATIONS

International Search Report dated Mar. 29, 2017 for PCT application No. PCT/US2017/012592.

(Continued)

*Primary Examiner* — Ngoc T Nguyen
(74) *Attorney, Agent, or Firm* — Terrance A. Meador

(57) ABSTRACT

Control of airflow in a uniflow-scavenged, two-stroke cycle, opposed-piston engine during transient operation includes monitoring at least one operating parameter of the engine to recognize a transition to a transient state of engine operation. If a transient state of operation is detected, fuel injection and airflow into to the cylinders of the engine are controlled to optimize combustion and limit emissions. Airflow into cylinders of the engine may be controlled by increasing a scavenging ratio of the engine or by increasing a trapping efficiency of the engine.

24 Claims, 8 Drawing Sheets

(51) Int. Cl.
*F02D 41/10* (2006.01)
*F02D 41/14* (2006.01)
*F02D 41/18* (2006.01)
*F02B 25/08* (2006.01)
*F01B 7/14* (2006.01)
*F02B 75/28* (2006.01)
*F02D 41/00* (2006.01)
*F02B 37/24* (2006.01)
*F02B 75/02* (2006.01)
*F02D 13/02* (2006.01)
*F02D 41/24* (2006.01)
*F02M 35/10* (2006.01)
*F02M 55/02* (2006.01)

(52) U.S. Cl.
CPC ...... *F02M 35/1038* (2013.01); *F02M 55/025* (2013.01); *F02B 2075/025* (2013.01); *F02D 2200/101* (2013.01); *F02D 2200/1002* (2013.01); *F02D 2200/602* (2013.01); *F02D 2400/04* (2013.01); *Y02T 10/144* (2013.01)

(56) References Cited

U.S. PATENT DOCUMENTS

| | | | |
|---|---|---|---|
| 4,719,893 A | 1/1988 | Buslepp et al. | 123/571 |
| 5,155,998 A | 10/1992 | Monden | 60/602 |
| 5,794,036 A | 8/1998 | Gomi et al. | 395/675 |
| 6,092,504 A | 7/2000 | Barnes et al. | 123/357 |
| 6,152,107 A | 11/2000 | Barnes et al. | 123/357 |
| 6,182,449 B1 | 2/2001 | Halimi et al. | 60/612 |
| 6,725,134 B2 | 4/2004 | Dillen et al. | 701/19 |
| 6,968,830 B2 | 11/2005 | Glenn et al. | 123/501 |
| 6,990,951 B1 | 1/2006 | Liu et al. | 123/299 |
| 7,000,590 B2 | 2/2006 | Carlton et al. | 123/357 |
| 7,063,076 B1 | 6/2006 | Min | 123/478 |
| 7,182,075 B2 | 2/2007 | Shahed et al. | 123/568.21 |
| 7,320,219 B2 | 1/2008 | Sun | 60/605.2 |
| 8,011,349 B2 | 9/2011 | Felton | 123/436 |
| 8,307,645 B2 | 11/2012 | Mischler et al. | 60/605.1 |
| 8,627,805 B2 | 1/2014 | Perr et al. | 123/568.12 |
| 8,904,787 B2 | 12/2014 | Styles et al. | 60/605.2 |
| 8,997,457 B2 | 4/2015 | Leone et al. | 13/219 |
| 9,062,577 B2 | 6/2015 | Koci et al. | F01N 3/035 |
| 9,109,546 B2 | 8/2015 | Andreae et al. | 25/728 |
| 9,206,751 B2 | 12/2015 | Herold et al. | 41/7 |
| 9,222,426 B2 | 12/2015 | Rollinger et al. | F02D 41/0002 |
| 9,228,512 B2 | 1/2016 | Chen et al. | F02D 41/0077 |
| 9,926,867 B1 | 3/2018 | Shum et al. | 701/108 |
| 9,957,901 B2 | 5/2018 | Nagar et al. | 123/704 |
| 2004/0181332 A1 | 9/2004 | Birkner et al. | 701/104 |
| 2005/0145222 A1 | 7/2005 | Glenn et al. | 123/501 |
| 2006/0117750 A1 | 6/2006 | Shahed et al. | 60/602 |
| 2006/0137660 A1 | 6/2006 | Shirakawa | 123/493 |
| 2007/0089715 A1 | 4/2007 | Kolavennu | 123/568.11 |
| 2007/0209362 A1 | 9/2007 | Sun | 60/602 |
| 2010/0005784 A1 | 1/2010 | Bird et al. | 60/284 |
| 2011/0067680 A1 | 3/2011 | Williams et al. | 123/568.21 |
| 2011/0225967 A1 | 9/2011 | Karnik et al. | 60/602 |
| 2011/0289916 A1 | 12/2011 | Dion et al. | 60/605.2 |
| 2011/0320105 A1 | 12/2011 | Takagawa et al. | 701/103 |
| 2012/0209496 A1 | 8/2012 | Miyashita | 701/102 |
| 2012/0312283 A1 | 12/2012 | Nam | 123/568.11 |
| 2012/0330534 A1 | 12/2012 | Cleeves et al. | 701/104 |
| 2013/0104848 A1 | 5/2013 | Klyza et al. | 123/445 |
| 2013/0289849 A1 | 10/2013 | Uehara et al. | 701/103 |
| 2013/0304357 A1 | 11/2013 | Koci et al. | 701/108 |
| 2014/0026563 A1 | 1/2014 | Dion et al. | 60/605.2 |
| 2014/0102092 A1 | 4/2014 | Karnik et al. | 60/602 |
| 2014/0299104 A1 | 10/2014 | Quechon et al. | 123/478 |
| 2014/0331963 A1 | 11/2014 | Grant et al. | 123/304 |
| 2014/0373814 A1 | 12/2014 | Herold et al. | 123/51 B |
| 2014/0373816 A1 | 12/2014 | Nagar | 123/51 B |
| 2015/0032308 A1 | 1/2015 | Whitney et al. | 701/22 |
| 2015/0033736 A1 | 2/2015 | Kalebjian et al. | 60/605.2 |
| 2015/0047322 A1 | 2/2015 | Peters | 123/568.12 |
| 2016/0237928 A1 | 8/2016 | Lana | 60/605.2 |
| 2017/0204790 A1 | 7/2017 | Nagar et al. | F02D 1/06 |

FOREIGN PATENT DOCUMENTS

| | | |
|---|---|---|
| WO | WO-2015/026628 A1 | 2/2015 |
| WO | WO-2017/123473 | 7/2017 |
| WO | WO-2018/106391 | 6/2018 |

OTHER PUBLICATIONS

International Search Report dated Mar. 30, 2017 for PCT application No. PCT/US2017/012570.
Final Office Action dated Feb. 8, 2018 for U.S. Appl. No. 15/062,868.
Communication pursuant to Rules 161(1) and 162 EPC, dated Jul. 13, 2018, for European application No. 17701398.4.
Communication pursuant to Rules 161(1) and 162 EPC, dated Jul. 13, 2018, for European application No. 17701395.0.
Notice of Allowance dated Mar. 13, 2018 for U.S. Appl. No. 15/062,868.
Non-Final Office Action dated Sep. 27, 2017, for U.S. Appl. No. 15/062,868.
Notice of Allowance dated Jan. 10, 2018, for U.S. Appl. No. 15/370,673.
International Search Report and Written Opinion dated Feb. 13, 2018, for PCT application No. PCT/US2017/060564.

CONTROL OF AIRFLOW IN A UNIFLOW-SCAVENGED, TWO-STROKE CYCLE, OPPOSED-PISTON ENGINE DURING TRANSIENT OPERATION

PRIORITY

This application claims priority to U.S. Provisional Application Ser. No. 62/279,301 filed in the United States Patent and Trademark Office on 15 Jan. 2016.

RELATED APPLICATIONS

This application contains subject matter related to the subject matter of the following US applications, which are commonly owned herewith: U.S. patent application Ser. No. 13/654,340, filed Oct. 17, 2012, published as US 2013/0104848 A1; U.S. patent application Ser. No. 13/926,360 filed on Jun. 25, 2013, published as US 2014/0373814 A1, and issued as U.S. Pat. No. 9,206,751 B2 on Dec. 8, 2015; U.S. patent application Ser. No. 14/039,856, filed on Sep. 27, 2013, published as US 2014/0026563 A1; U.S. patent application Ser. No. 14/378,252, filed on Aug. 12, 2014, published as US 2015/0033736 A1; and, U.S. patent application Ser. No. 15/062,868, filed on Mar. 7, 2016.

FIELD

The field is control and operation of air handling systems for two-stroke cycle, opposed-piston engines.

BACKGROUND

A two-stroke cycle engine is an internal combustion engine that completes a cycle of operation with a single complete rotation of a crankshaft and two strokes of a piston connected to the crankshaft. The strokes are typically denoted as compression and power strokes. In a two-stroke cycle, opposed-piston ("OP2S") engine two pistons are disposed crown-to-crown in the bore of a cylinder for reciprocating movement in opposing directions along the central axis of the cylinder. The cylinder has longitudinally-spaced inlet and exhaust ports formed in the cylinder sidewall near respective ends of the cylinder. Each of the opposed pistons controls a respective one of the ports, opening the port as it moves toward a bottom dead center (BDC) location during a power stroke (also called an expansion stroke), and closing the port as it moves from BDC toward a top dead center (TDC) location during a compression stroke. One of the ports provides passage for the products of combustion out of the bore, the other serves to admit pressurized air into the bore; these are respectively termed the "exhaust" and "intake" ports (in some descriptions, intake ports are referred to as "air" ports or "scavenge" ports).

OP2S engines typically operate according to the compression-ignition principle. During a compression stroke, turbulent pressurized air ("charge air") enters the bore of a cylinder through the intake port and is compressed between the end surfaces of the two pistons as they move from BDC toward TDC. Fuel directly injected into the cylinder between the approaching piston end surfaces mixes with the turbulent air. The fuel is ignited by the heat of the compressed air, and combustion follows. Fuel is provided by an engine fuel handling system that includes one or more fuel injectors mounted to the cylinder between the TDC locations of the piston end surfaces.

In a uniflow-scavenged OP2S engine, near the end of a power stroke, charge air entering a cylinder through the intake port displaces exhaust gas flowing out of the cylinder through the exhaust port. Thus gas flows through the cylinder in one direction ("uniflow")—from intake port to exhaust port. A continuous positive pressure differential must exist from the intake ports to the exhaust ports of the engine in order to maintain the desired unidirectional flow of gas in the cylinders. Further, a high air mass density must be provided to the intake ports because of the short time that they are open; this need is especially acute during engine start, acceleration, and load increases. This requires pumping work.

In an opposed-piston engine, the pumping work is done by an air handling system (also called a "gas exchange" system) which moves fresh air into and transports combustion gases (exhaust) out of the engine. The pumping work may be done by a gas-turbine driven compressor (e.g., a turbocharger), and/or by a mechanically-driven pump, such as a supercharger (also called a "blower"). In some instances, the compressor may be located upstream or downstream of a supercharger in a two-stage pumping configuration. The pumping arrangement (single stage, two-stage, or otherwise) can drive the scavenging process, which is critical to ensuring effective combustion, increasing the engine's indicated thermal efficiency, and extending the lives of engine components such as pistons, rings, and cylinder.

During steady state performance of an OP2S engine, operational parameters change slowly, if at all. Thus, for example, when propelling a vehicle on a highway at a steady speed, the transport of gasses (charge air and exhaust) through, and provision of fuel in, the vehicle's OP2S engine can be maintained at a slowly-changing pace. This translates to stable control with enough time to optimize engine performance in terms of fuel efficiency and emissions. However, vehicle operation frequently subjects the engine to sudden demands for torque, especially in urban driving or during operation in industrial conditions. Such demands may come from acceleration, deceleration, switching accessories (like air conditioning) on or off, pulling a trailer, climbing a hill, and so on. A sudden demand for torque associated with an abrupt change in engine load or engine speed is considered to be a transient event. Such a demand is hereinafter referred to as a "torque request" During a transient event, a demand for increased torque generates a requirement to quickly increase the supply of fuel to the engine in order to raise the level of energy released by combustion. This requires a concurrent provision of additional air in order to burn the additional fuel.

It is desirable to limit the production of emissions during engine operation. Consequently, during a transient event, a limiting factor for OP2S engine response may be defined by how rapidly the air handling system can change the flow of charge air through the engine in support of a torque request while keeping engine emissions under control. During the period of the torque request, a low air/fuel ratio (AFR) value due to the lack of charge air can result in incomplete combustion, leading to particulate matter (PM) emissions, such as soot. On the other hand, reducing the fuel supply to maintain a target AFR can result in poor engine response.

In a uniflow-scavenged OP2S engine, some of the air delivered to a cylinder during a cycle of engine operation ("delivered air") flows out of the exhaust port during scavenging and thus is not available for combustion. An accurate measure of AFR for use in controlling combustion uses the mass of charge air retained ("trapped") in the cylinder when the last port of the cylinder is closed. Depending on engine design either the exhaust port or the intake port may be the last to close; in many instances, the intake port is the last to close. It is further the case that, in addition to the trapped charge air, a measurable mass of residual exhaust gas may sometimes be trapped in the cylinder by closure of the exhaust port and/or by recirculation into the cylinder with the charge air.

Provision of fuel and air in the engine is governed by an engine control mechanization that senses various engine operating parameters and regulates the flow of gasses (air and exhaust) through the engine and the injection of fuel into the engine. It is particularly desirable that the engine control mechanization be able to recognize transient events of an OP2S engine so as to rapidly configure the air handling system for increasing the amount of delivered and/or retained charge air provided to the cylinders in response to torque requests.

The gas pressure differential across the engine that is necessary to sustain the unidirectional flow of charge air and exhaust is generated and sustained by air handling elements of the air handling system, which may include a supercharger and one or more turbochargers. During steady state operation the engine control mechanization governs these elements in a closed-loop mode by continuous adjustments that seek desired target values ("setpoints") for particular air flow parameters in order to maintain efficient operation with low emissions. When a demand for increased torque is made, the charge air pressure must be rapidly increased ("boosted").

Therefore, it is desirable that the air handling system of a uniflow-scavenged, OP2S engine respond to a torque request without significant delay, while maintaining control of emissions during transient operation.

SUMMARY

In a turbocharged, uniflow-scavenged, OP2S engine with a crankshaft-driven supercharger disposed in the air handling system between a compressor and engine intake ports, torque requests initiate transient modes of operation during which provision of fuel and charge air are increased or decreased while desired modes of control over emissions are maintained.

Thus, when a transient event occurs, fuel injection into the cylinders of the engine is controlled. For example, with a common rail direct injection fuel handling system, fuel injection is increased (or decreased) by changing one or more of a fuel rail pressure and a fuel injection duration in response to an increase in engine load. Concurrently, airflow into cylinders of the engine is increased (or decreased) by controlling an airflow parameter representing charge air that is trapped or retained in the cylinders by last port closings.

One airflow parameter representing charge air that is trapped or retained in a cylinder by last port closing is a scavenging ratio (SR) of the engine, which is the ratio between a mass of delivered air and a mass of trapped charge which includes trapped charge air, and which may include residual or recirculated exhaust. For example, by increasing SR, the mass of charge air flowing through a cylinder increases, thereby reducing charge air exhaust residuals in the cylinder, which results in less PM generation since there is more fresh charge for combustion. The trade-off can possibly be an increase in nitrous oxide (NOx) emissions due to more fresh charge air available for combustion.

Another airflow parameter representing charge air that is trapped or retained in a cylinder by last port closing is a trapping efficiency (TE) of the engine, which is the ratio between a mass of delivered charge air and a mass of trapped charge air. For example, a higher compressor outlet pressure will result in more volumetric flow across a supercharger, thereby increasing the boost pressure and resulting in more trapped mass (charge air and exhaust) in the cylinders. More trapped mass may result in higher PM but with more trapped exhaust, NOx emissions can be lowered.

DETAILED DESCRIPTION OF THE PREFERRED EMBODIMENTS

Figure 1:
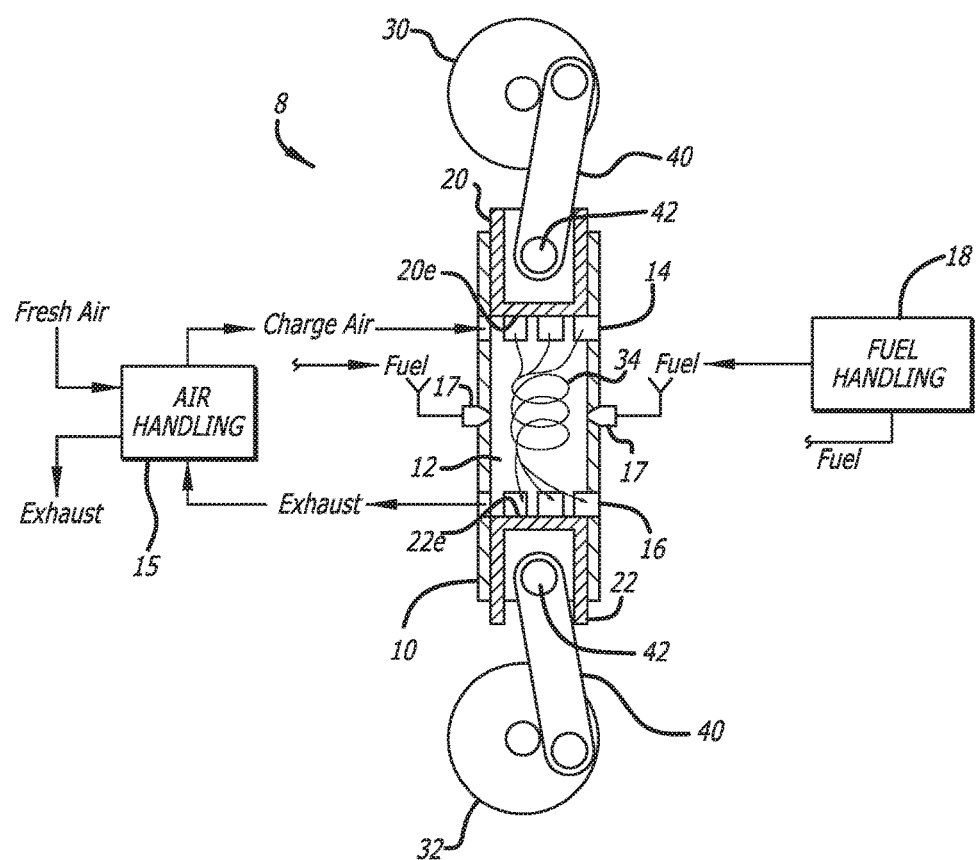
FIG. 1 is a schematic illustration of a uniflow-scavenged, two-stroke cycle, opposed-piston (OP2S) engine of the prior art.

FIG. 1 is a schematic representation of a uniflow-scavenged, two-stroke cycle opposed-piston (OP2S) engine 8 of the compression ignition type that includes at least one cylinder. Preferably, the engine 8 has two or more cylinders. In any event, the cylinder 10 represents both single cylinder and multi-cylinder configurations of the OP2S engine 8. The cylinder 10 includes a bore 12 and longitudinally displaced intake and exhaust ports 14 and 16 machined or formed in the cylinder, near respective ends thereof. An air handling system 15 of the engine 8 manages the transport of charge air into, and exhaust out of, the engine. Each of the intake and exhaust ports includes one or more circumferential arrays of openings in which adjacent openings are separated by a solid portion of the cylinder wall (also called a "bridge"). In some descriptions, each opening is referred to as a "port"; however, the construction of a circumferential array of such "ports" is no different than the port constructions in FIG. 1. Fuel injectors 17 include nozzles that are secured in threaded holes that open through the sidewall of the cylinder. A fuel handling system 18 of the engine 8 provides fuel for direct side injection by the injectors 17 into the cylinder. Two pistons 20, 22 are disposed in the bore 12 with their end surfaces 20e, 22e in opposition to each other. For convenience, the piston 20 is referred to as the "intake" piston because it opens and closes the intake port 14. Similarly, the piston 22 is referred to as the "exhaust" piston because it opens and closes the exhaust port 16. Preferably, but not necessarily, the intake piston 20 and all other intake pistons are coupled to a crankshaft 30 disposed along one side of the engine 8; and, the exhaust piston 22 and all other exhaust pistons are coupled to a crankshaft 32 disposed along the opposite side of the engine 8.

Operation of the OP2S engine 8 is well understood. In response to combustion the opposed pistons move away from respective TDC locations where they are at their innermost positions in the cylinder 10. While moving from TDC, the pistons keep their associated ports closed until they approach respective BDC locations where they are at their outermost positions in the cylinder and the associated ports are open. The pistons may move in phase so that the intake and exhaust ports 14, 16 open and close in unison. Alternatively, one piston may lead the other in phase, in which case the intake and exhaust ports have different opening and closing times.

As charge air enters the cylinder 10 through the intake port 14, the shapes of the intake port openings cause the charge air to rotate in a vortex 34 about the cylinder's longitudinal axis, which spirals in the direction of the exhaust port 16. A swirl vortex 34 promotes air/fuel mixing, combustion, and suppression of pollutants. Swirl velocity increases as the end surfaces 20e and 22e move together.

Figure 2:
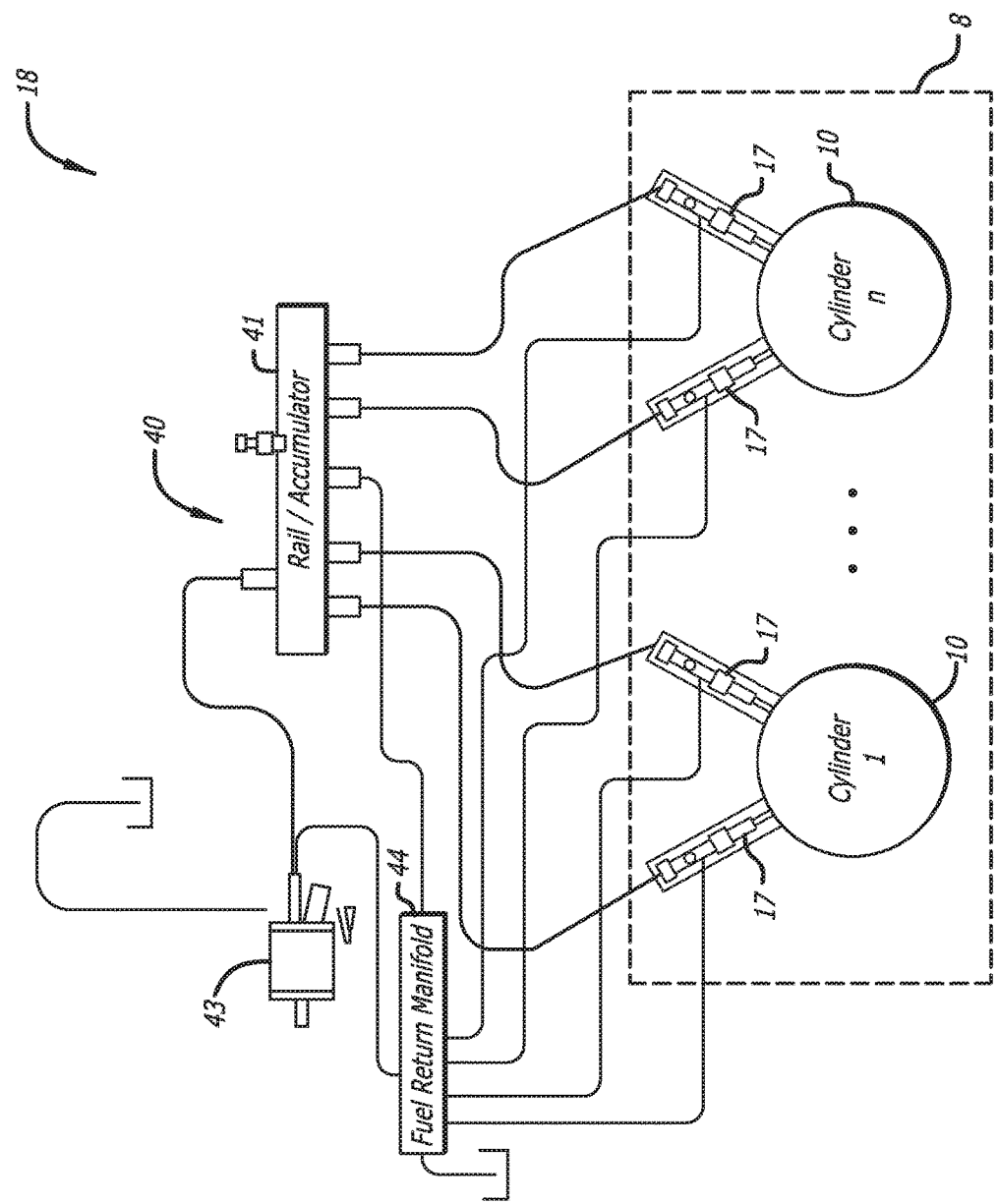
FIG. 2 is a schematic diagram illustrating a fuel injection system embodiment for the OP2S engine of FIG. 1.

FIG. 2 shows the fuel handling system 18 embodied as a common rail direct injection fuel handling system. The fuel handling system 18 delivers fuel to each cylinder 10 by injection into the cylinder. Preferably, each cylinder 10 is provided with multiple fuel injectors mounted for direct injection into cylinder space between the end surfaces of the pistons. For example, each cylinder 10 has two fuel injectors 17. Preferably, fuel is fed to the fuel injectors 17 from a fuel source 40 that includes at least one rail/accumulator mechanism 41 to which fuel is pumped by a fuel pump 43. A fuel return manifold 44 collects fuel from the fuel injectors 17 and the fuel source 40 for return to a reservoir from which the fuel is pumped. Elements of the fuel source 40 are operated by respective computer-controlled actuators that respond to fuel commands issued by an engine control unit. Although FIG. 2 shows the fuel injectors 17 of each cylinder disposed at an angle of less than 180°, this is merely a schematic representation and is not intended to be limiting with respect to the locations of the injectors or the directions of the sprays that they inject. In a preferred configuration, best seen in FIG. 1, the injectors 17 are disposed for injecting fuel sprays in diametrically opposing directions of the cylinder 8 along an injection axis. Preferably, each fuel injector 17 is operated by a respective computer-controlled actuator that responds to injector commands issued by an engine control unit.

Figure 3:
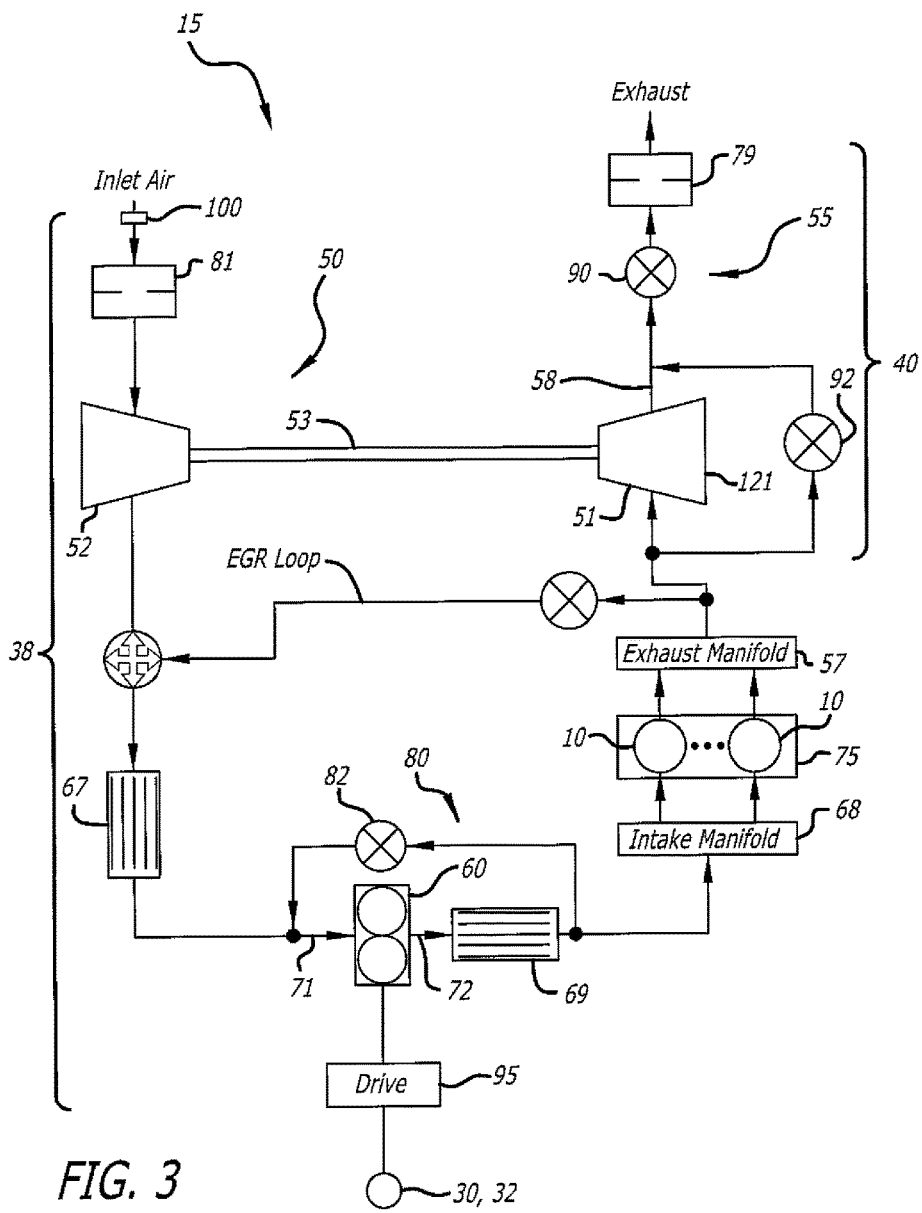
FIG. 3 is a schematic diagram illustrating an air handling system embodiment for the OP2S engine of FIG. 1.

FIG. 3 shows an embodiment of the air handling system 15 that manages the transport of charge air provided to, and exhaust gas produced by, the OP2S engine 8. A representative air handling system construction includes a charge air subsystem 38 and an exhaust subsystem 40. In the air handling system 15, a charge air source receives fresh air and processes it into charge air. The charge air subsystem 38 receives the charge air and transports it to the intake ports of the engine 8. The exhaust subsystem 40 transports exhaust products from exhaust ports of the engine for delivery to other exhaust components.

The air handling system 15 includes a turbocharger system that may comprise one or more turbochargers. For example, a turbocharger 50 includes a turbine 51 and a compressor 52 that rotate on a common shaft 53. The turbine 51 is disposed in the exhaust subsystem 40 and the compressor 52 is disposed in the charge air subsystem 38. The turbocharger 50 extracts energy from exhaust gas that exits the exhaust ports and flows into the exhaust subsystem 40 directly from engine exhaust ports 16, or from an exhaust manifold assembly 57 that collects exhaust gasses output through the exhaust ports. Preferably, in a multi-cylinder OP2S engine, the exhaust manifold 57 comprises an exhaust plenum or chest that communicates with the exhaust ports 16 of all cylinders 10, which are supported in a cylinder block 75. The turbine 51 is rotated by exhaust gas passing through it to an exhaust outlet 58. This rotates the compressor 52, causing it to generate charge air by compressing fresh air.

Exhaust gasses from the exhaust ports of the cylinders 50 flow from the exhaust manifold assembly 57 into the inlet of the turbine 51, and from the turbine's outlet into an exhaust outlet channel 55. In some instances, one or more after-treatment devices 79 are provided in the exhaust outlet channel 55. While the air handling system 15 may be constructed to reduce NOx emissions produced by combustion by recirculating exhaust gas through the ported cylinders of the engine, the details of an exhaust gas recirculation (EGR) loop are not necessary to an understanding of transient response according to this disclosure.

The charge air subsystem may provide inlet air to the compressor 52 via an air filter 81. As the compressor 52 rotates it compresses inlet air, and the compressed inlet air flows into the inlet 71 of a supercharger 60. Air pumped by the supercharger 60 flows through the supercharger's outlet 72 into the intake manifold 68. Pressurized charge air is delivered from the intake manifold 68 to the intake ports 14 of the cylinders 10. Preferably, in a multi-cylinder OP2S engine, the intake manifold 68 comprises an intake plenum or chest that communicates with the intake ports 14 of all cylinders 10.

The charge air subsystem may further include at least one cooler coupled to receive and cool charge air before delivery to the intake ports of the engine 8. In these instances, charge air output by the compressor 52 flows through a cooler 67, whence it is pumped by the supercharger 60 to the intake ports. A second cooler 69 may be provided between the output of the supercharger 60 and the intake manifold 68.

With further reference to FIG. 3, the air handling system 15 is equipped for control of gas flow at separate control points in the charge air and exhaust subsystems. In the charge air subsystem, charge air flow and boost pressure are controlled by operation of a shunt path 80 coupling the output 72 of the supercharger to the supercharger's input 71. The shunt path 80 includes a shunt valve 82 that governs the flow of charge air into, and thus the pressure in, the intake manifold 68. More precisely, the shunt valve 82 shunts the charge air flow from the supercharger's outlet 72 (high pressure) to its inlet 71 (lower pressure). Sometimes those skilled in the art refer to the shunt valve 82 as a "bypass" valve or a "recirculation" valve. A backpressure valve 90 in the exhaust channel 55 governs the flow of exhaust out of the turbine and thus the backpressure in the exhaust subsystem for various purposes, including modulation of the exhaust temperature. As per FIG. 3, the backpressure valve 90 is positioned in the exhaust channel 55, between the output 58 of the turbine 51 and the after-treatment devices 79. A wastegate valve 92 diverts exhaust gasses around the turbine, which enables control of the speed of the turbine. Regulation of the turbine speed enables regulation of the compressor speed which, in turn, permits control of charge air boost pressure. The valves 82, 90, and 92 are opened and closed by respective computer-controlled actuators that respond to rotational commands issued by an engine control unit. In some cases, these valves may be controlled to two states: fully opened or fully closed. In other cases, any one or more of the valves may be variably adjustable to a plurality of states between fully opened and fully closed.

In some instances, additional control of gas flow and pressure is provided by way of a variable speed supercharger. In these aspects, the supercharger 60 is coupled by a drive mechanism 95 (Drive) to a crankshaft 30 or 32 of the engine 8, to be driven thereby. The drive mechanism 95 may comprise a stepwise transmission device, or a continuously variable transmission device (CVD), in which cases charge air flow, and boost pressure, may be varied by varying the speed of the supercharger 60 in response to a speed control signal provided to the drive mechanism 95. In other instances, the supercharger may be a single-speed device with a mechanism to disengage the drive, thus giving two different drive states. In yet other instances, a disengagement mechanism may be provided with a stepwise or continuously variable drive. In any event, the drive mechanism 95 is operated by a computer-controlled actuator that responds to drive commands issued by an engine control unit.

In some aspects, the turbine 51 may be a variable-geometry turbine (VGT) device having an effective aspect ratio that may be varied in response to changing speeds and loads of the engine. Alteration of the aspect ratio enables control of the speed of the turbine. Regulation of the turbine speed enables regulation of the compressor speed which, in turn, permits control of charge air boost pressure. Thus, in many cases, a turbocharger comprising a VGT does not require a wastegate valve. A VGT device is operated by a computer-controlled actuator that responds to turbine commands issued by an engine control unit.

In this disclosure, an engine control mechanization is a computer-based system that governs the operations of various engine systems, including the fuel handling system, the air handling system, a cooling system, a lubrication system, and other engine systems. The engine control mechanism includes one or more electronic control units coupled to associated sensors, actuators, and other machine devices throughout the engine. As per FIG. 4, control of the fuel handling system of FIG. 2 and the air handling system of FIG. 3 (and, possibly, other systems of the OP2S engine 8) is implemented by a control mechanization 93 that includes a programmable engine control unit (ECU) 94 programmed to execute fuel handling algorithms and air handling algorithms under various engine operating conditions. Such algorithms are embodied in control modules that are part of an engine systems control program executed by the ECU 94 while the engine is operating. For the common rail direct injection system, the ECU 94 controls injection of fuel into the cylinders by issuing rail pressure (Rail) commands to the fuel source 40, and by issuing injector (Injector) commands for operation of the injectors 17. For the air handling system the ECU 94 controls the transport of gas (charge air and exhaust) through the engine by issuing backpressure (Backpressure), wastegate (Wastegate) and shunt (Shunt) commands to open and close the exhaust backpressure valve 90, the wastegate valve 92, and the supercharger shunt valve 82, respectively. In cases where the supercharger 60 is operated by a variable drive, the ECU 94 also controls gas transport by issuing drive (Drive) commands to actuate the supercharger drive 95. And, in those instances where the turbine 51 is configured as a variable geometry device, the ECU 94 also controls the transport of gas by issuing VGT commands to set the aspect ratio of the turbine.

When the OP2S engine 8 runs, the ECU 94 determines the current engine operating state based on engine load and engine speed, and governs the amount, pattern, and timing of fuel injected into each cylinder 10 by control of common rail fuel pressure and injection duration, based on the current operating state. For this purpose, the ECU 94 receives signals from an accelerator sensor 96 (or a speed governor or a cruise control system, or equivalent means) that detects accelerator position, an engine speed sensor 97 that detects the rotational speed of the engine, and a sensor 98 that detects rail pressure. At the same time, the ECU 94 configures the air handling system 15 to provide the optimal AFR for the current operational state. For this purpose, the ECU receives signals from air flow sensors that may include one or more of a mass air flow sensor 100 that detects the mass flow of air into the inlet of the compressor 52, an intake manifold pressure sensor 101 that detects charge air pressure in the intake manifold 68, an exhaust manifold pressure sensor 102 that detects exhaust pressure in the exhaust manifold 57, a supercharger intake pressure sensor 103 that detects charge air pressure at the intake of the supercharger 60, a supercharger outlet pressure sensor 104 that detects charge air pressure at the outlet of the supercharger 60, and, possibly other sensors.

During engine operation, the ECU 94 monitors a transient indication parameter which indicates changes in the engine load and/or the engine speed. A sudden change in the transient indication parameter, at a rate that indicates a transient state, causes the ECU 94 to invoke a transient control module. In this regard, a transient indication parameter may be based on or derived from sensor information including, without limitation, one or more of accelerator (gas pedal) movement, engine speed, engine acceleration, crankshaft angle, and fuel demand. The ECU 94 determines a transient indication parameter value (from gas pedal movement, for example) and also measures, estimates, or calculates (hereinafter, "calculates") a rate of change of the transient indication parameter value.

Figure 4:
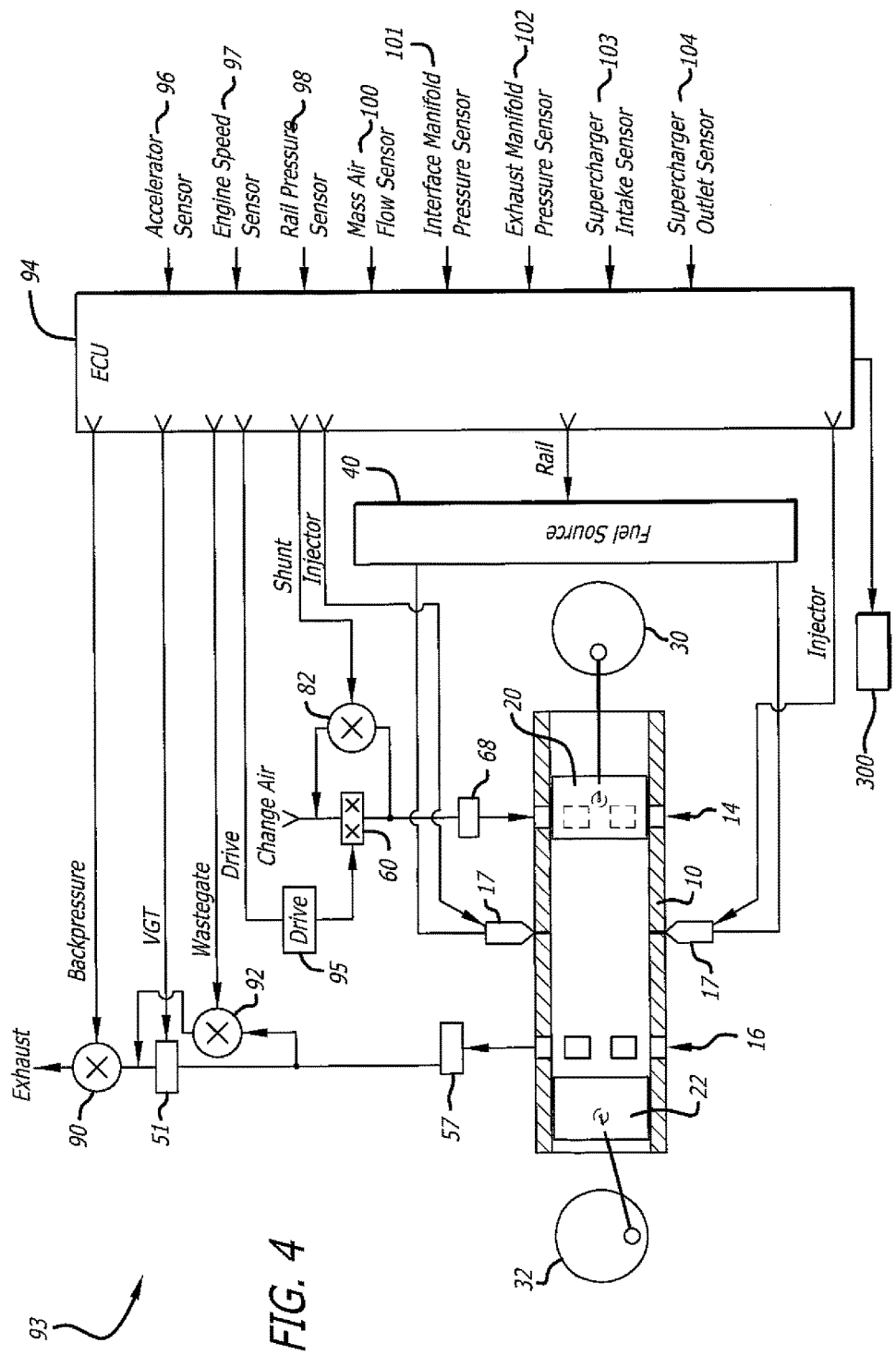
FIG. 4. is a schematic diagram illustrating a control mechanization embodiment for the OP2S engine of FIG. 1.
Figure 5:
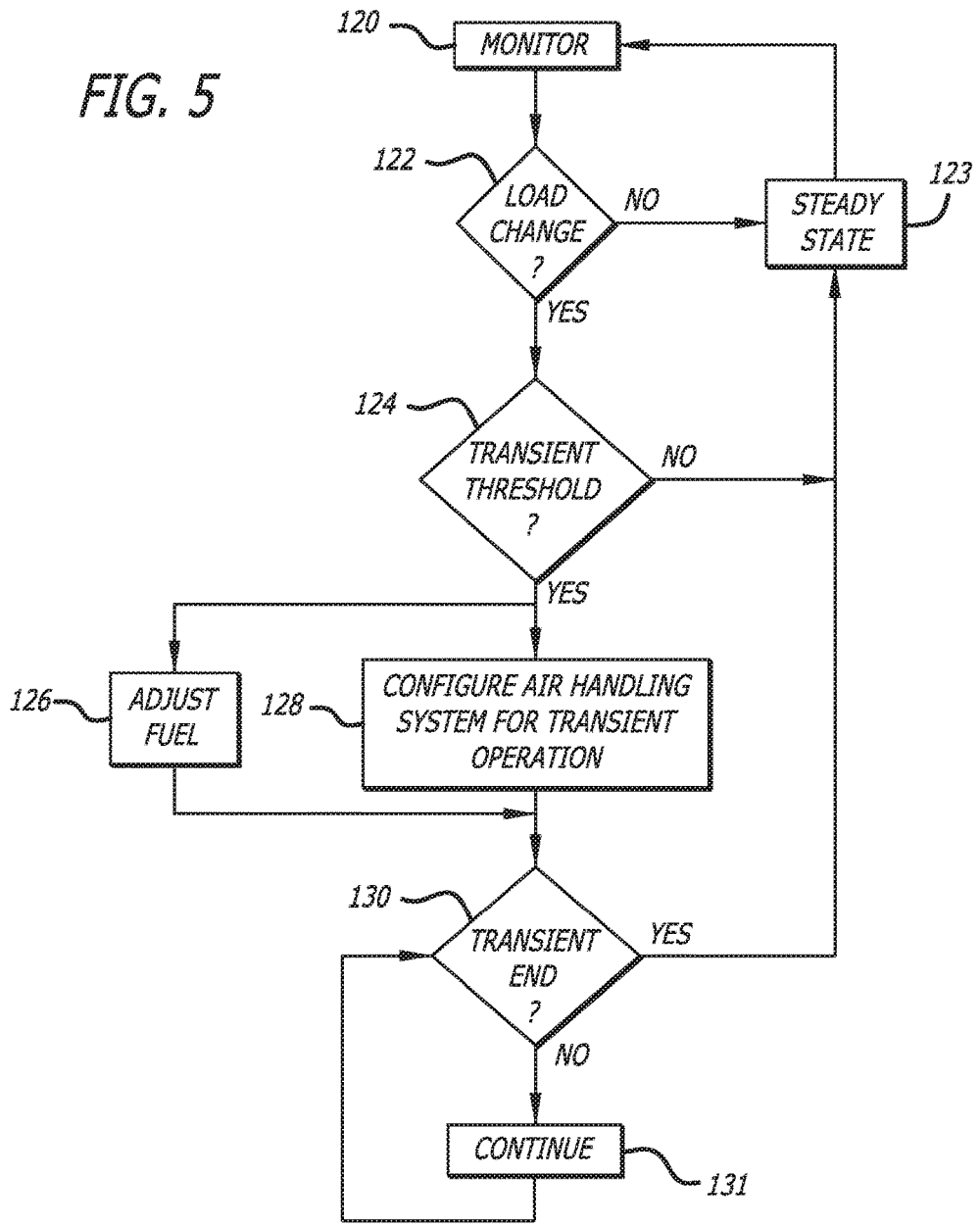
FIG. 5 is a flow diagram illustrating a transient control algorithm implemented by operation of a control mechanization embodiment according to FIG. 4.

The ECU 94 is programmed to execute a transient control algorithm via the control mechanization 93 of FIG. 4. The transient control algorithm enables the ECU 94 to monitor and respond to transient activity of the OP2S engine. An exemplary embodiment of the transient control algorithm is illustrated in FIG. 5. With reference to FIGS. 4 and 5, presume that the engine is operating in a steady state when the ECU 94 initiates a monitoring process at step 120. The monitoring process enables the ECU 94 to detect and respond to a torque demand. In decision step 122, the ECU monitors the engine load and speed parameters for change. An increase in engine load (such as would be indicated by movement of an accelerator pedal, for example) indicates a positively-directed torque demand. Conversely, a decrease in engine load indicates a negatively-directed torque demand. If the ECU detects no torque demand in decision step 122, steady state operation is maintained at 123. However, if a torque demand is detected, the positive exit from decision step 122 is followed to decision step 124.

In decision step 124, the ECU 94 monitors the rate of change of the transient indication parameter (hereinafter "transient intensity") with respect to a transient intensity calibration threshold value for an indication of a transient state of operation. If transient intensity does not reach the transient intensity calibration threshold value, the ECU 94 follows the negative exit from decision step 124 and exercises steady state control to configure the fuel and air handling systems for optimal AFR. However, if the transient intensity exceeds the calibration threshold value, the ECU 94 follows the positive exit from decision step 124 and initiates a transient mode of operation in steps 126 and 128. At step 126, a demanded fuel quantity is calculated from the demanded torque. In some instances the calculated fuel demand may differ from the amount of fuel actually delivered. In this regard, the ECU 94 may execute a fuel limiter or smoke limiter routine which limits the delivered fuel based on current airflow and current AFR. See, for example, the fuel limiter for a uniflow-scavanged, two-stroke cycle, opposed-piston engine described in commonly-owned, co-pending U.S. patent application Ser. No. 15/062,868. In response to a demand for increased torque, ECU 94 determines a required increase (or decrease) in the amount of delivered fuel, and adjusts the common rail pressure and injection duration, as necessary to satisfy the demand.

At step 128, the ECU 94 exercises a transient control process to configure the air handling system for controlling unidirectional airflow through cylinders of the engine as required to support combustion of the demanded fuel. In some aspects, when a low-to-high transition in torque demand signals the onset of a transient condition such control is exercised by reducing airflow resistance and increasing charge air velocity. In some other aspects, when a high-to-low transition in torque demand signals the onset of a transient condition such control is exercised by increasing airflow resistance and decreasing charge air velocity.

For example, in responding to a demand for increased torque, the ECU 94 may implement an air handling strategy that ensures the airflow path from the intake ports of the engine to the exhaust channel 55 is configured to prioritize the scavenging ratio of the engine by increasing the flow of charge air delivered to the cylinders, as is desirable to maintain the positive pressure drop and a high air flow rate from intake to exhaust for the OP2S. In this case, the ECU 94 increases charge air flow by reducing exhaust flow resistance and increasing the pressure drop across the engine. Depending upon a desired emissions result, the ECU 94 either continues to give priority to the scavenging ratio or transitions priority to trapping efficiency by increasing the compressor outlet pressure, thereby increasing the mass flow rate of charge air.

The ECU 94 continues to execute the monitoring process by continuing to decision step 130 where the ECU 94 maintains transient control over the air handling system through the loop 130, 131 until the torque demand is met, at which time the ECU takes the positive exit from decision step 130, reasserts steady-state control and returns to monitoring engine load and/or engine speed via decision step 122.

Figure 6:
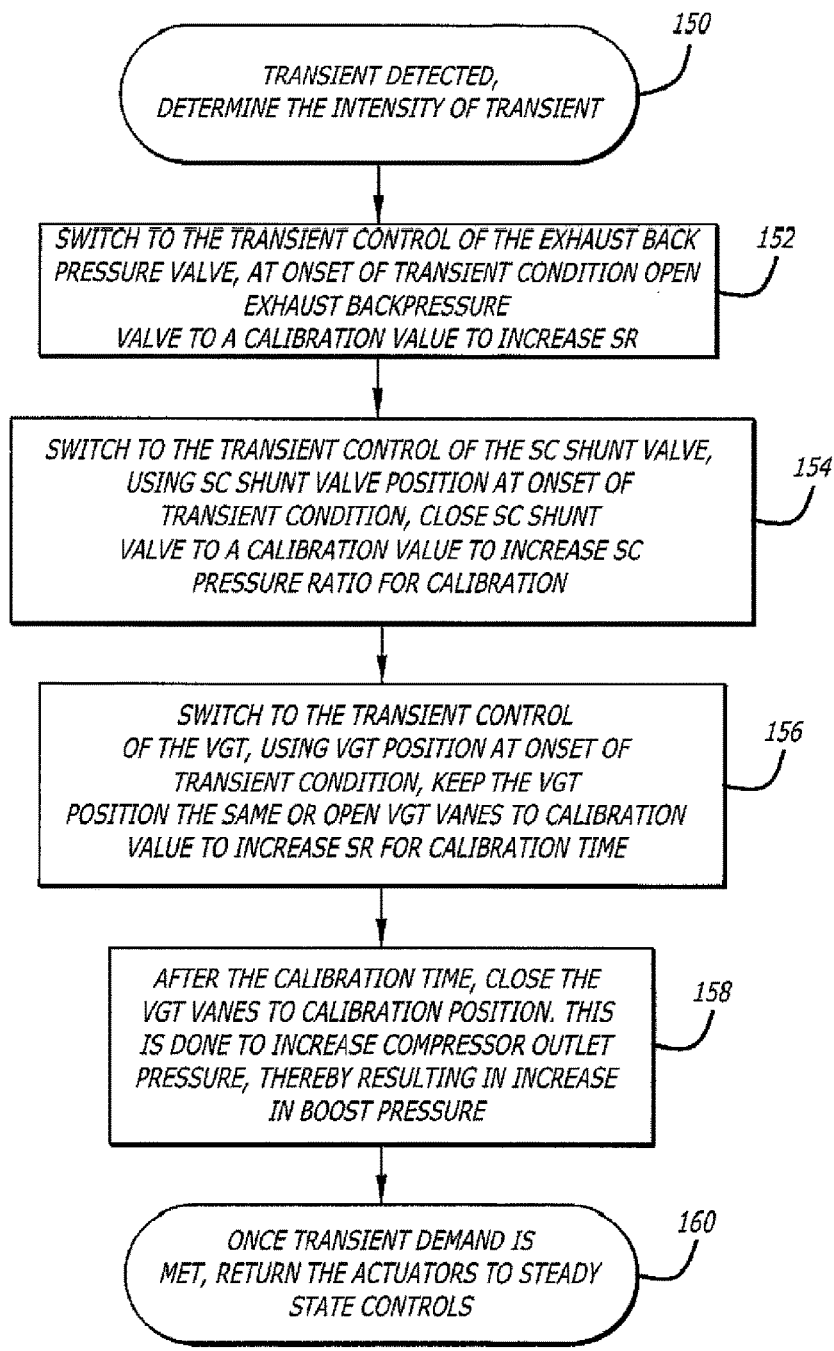
FIG. 6 is a flow diagram illustrating an air handling configuration step of the transient control algorithm by which scavenging ratio is prioritized.

In response to a demand for increasing torque at a rate that indicates transient control, the ECU 94 may be programmed to operate according to a scavenging ratio (SR) preference strategy in configuration step 128 of FIG. 5 by executing the process illustrated in FIG. 6. Referring to FIGS. 4 and 6, in step 150, the ECU 94 calculates a level of transient intensity and detects a transient condition when the transient intensity level meets or exceeds a transient intensity calibration threshold value, at which point the ECU 94 switches to transient control of the supercharger drive 95, the valves 82, 90, and 92, and the turbine 51 (if configured as a VGT device).

In step 152, the ECU 94 opens the backpressure valve 90 to a setting calibrated for the calculated level of transient intensity. This reduces the resistance of the exhaust subsystem to the delivery of charge air, which increases the scavenging ratio.

In step 154, the ECU 94 increases the velocity of charge air provided to the intake ports of the engine in order to accelerate the unidirectional flow of gas in the engine. Charge air velocity is increased by increasing the supercharger pressure ratio (outlet pressure/inlet pressure), which further increases the scavenging ratio. This can be done by closing the supercharger shunt valve 82 to a value calibrated for the calculated transient intensity. This can also be done by changing the setting of the supercharger drive 95 to a value calibrated for the level of transient intensity. In some aspects, the ECU 94 may control both the shunt valve and the drive in order to achieve a finer control over the operation of the supercharger 60.

In step 156, the ECU 94 further reduces the resistance of the exhaust subsystem to the delivery of charge air by reducing the resistance of the turbine 51 to the flow of exhaust, which further increases the scavenging ratio. If the turbine 51 is a fixed-geometry device, the ECU 94 opens the wastegate valve 92 to a value calibrated for the measured transient intensity. On the other hand, if the turbine 51 is a variable-geometry device, the ECU 94 opens the vanes of the turbine 51 to a value calibrated for the measured transient intensity.

The changes made to the configuration of the air handling system by the ECU 94 in steps 152, 154, and 156 are initiated substantially simultaneously, at the onset of the transient condition, and the ECU 94 measures time from the point of onset. Upon elapse of a period of time calibrated for the level of transient intensity, the ECU 94, in step 158, activates the turbine 51 in order to increase the compressor outlet pressure, thereby resulting in an increase in boost pressure. This is done either by closing the wastegate valve 92 to a calibrated position (if the turbine is a fixed-geometry device) or by opening the turbine vanes to a calibrated position (if the turbine is a VGT device).

In step 160, once the airflow demand is met, the ECU 94 returns to steady-state control of the air handling system.

Figure 7:
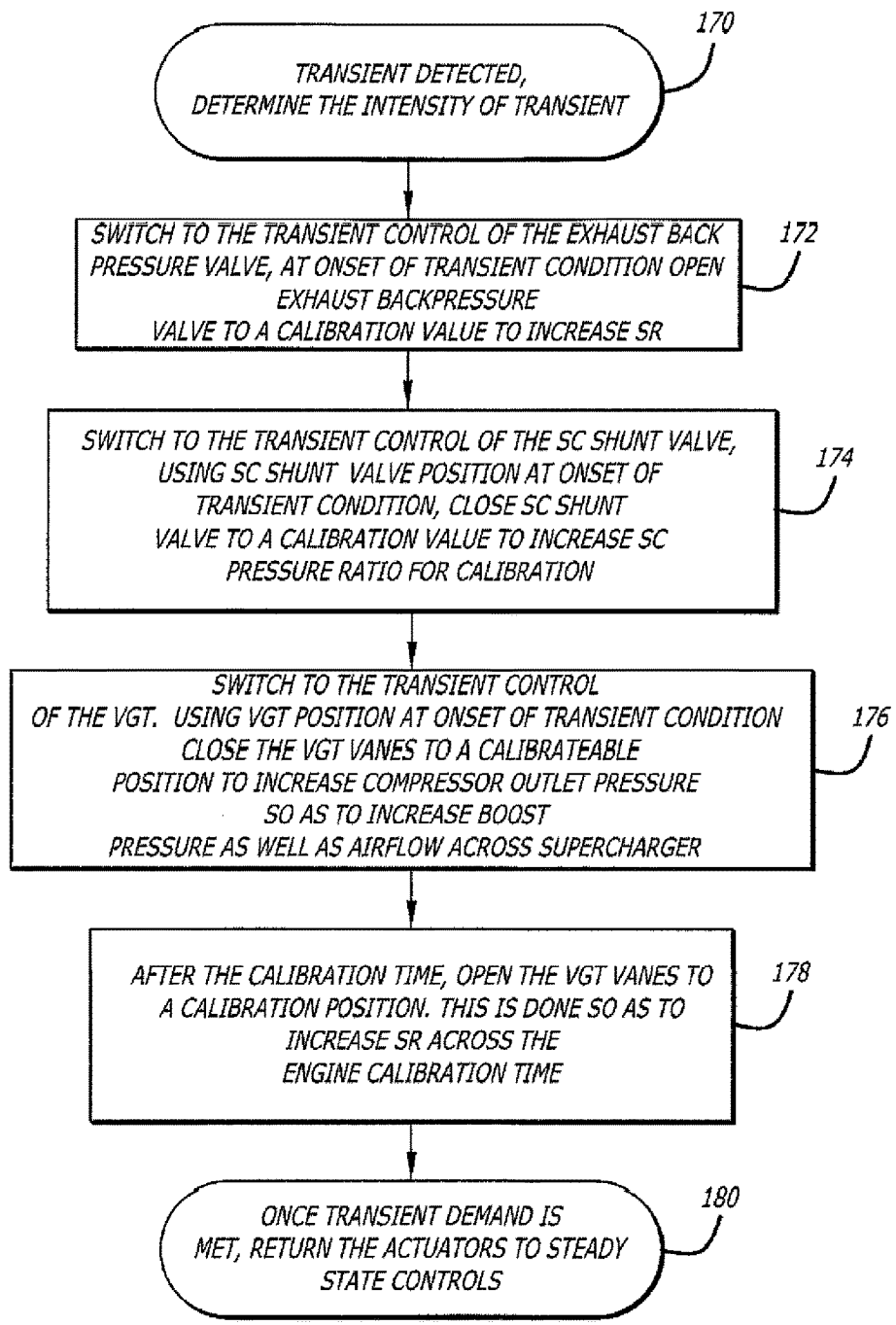
FIG. 7 is a flow diagram illustrating an air handling configuration step of the transient control algorithm by which trapping efficiency is prioritized.

In response to a demand for increasing torque at a rate that indicates transient control, the ECU 94 may be programmed to operate according to a trapping efficiency (TE) preference strategy in configuration step 128 of FIG. 5 by executing the process the process illustrated in FIG. 7. Referring to FIGS. 4 and 7, in step 170, the ECU 94 calculates a level of transient intensity and detects the onset of a transient condition when the transient intensity level meets or exceeds a transient intensity calibration threshold value, at which point the ECU 94 switches to transient control of the supercharger drive 95, the valves 82 and 90, and 92, and the turbine 51 (if configured as a VGT device).

In step 172, the ECU 94 opens the backpressure valve 90 to a value calibrated for the calculated intensity of the torque demand. This reduces the resistance of the exhaust subsystem to the delivery of charge air, which increases the scavenging ratio.

In step 174, the ECU 94 accelerates the delivery of charge air to the intake ports of the engine by increasing the supercharger pressure ratio, which further increases the scavenging ratio. This can be done by closing the supercharger shunt valve 82 to a value calibrated for the calculated intensity of the torque demand. This can also be done by changing the setting of the supercharger drive 95 to a value calibrated for the calculated intensity of the torque demand. In some aspects, both the shunt valve and the drive may be controlled to achieve a finer control over the speed of the supercharger 60.

In step 176, the ECU 94 activates the turbine 51, which increases the mass and velocity of the compressed air delivered by the compressor 52 to the supercharger 60. The increased mass of charge delivered to the cylinders increases the trapping efficiency of the OP2S engine. If the turbine 51 is a fixed-geometry device, the ECU 94 closes the wastegate valve 92 to a value calibrated for the measured intensity of the torque demand. On the other hand, if the turbine 51 is a variable-geometry device, the ECU 94 closes the vanes of the turbine 51 to a value calibrated for the measured intensity of the torque demand.

The changes made to the configuration of the air handling system by the ECU 94 in steps 174 and 176 are initiated substantially simultaneously, and time is measured from the point of initiation. Upon elapse of a period of time calibrated for the measured intensity of the torque demand, the ECU 94, in step 178, reduces the speed of the turbine 51 in order to reduce the compressor outlet pressure, thereby resulting in an increase in scavenging ratio. This is done either by opening the wastegate valve 92 to a calibrated position (if the turbine is a fixed-geometry device) or by closing the turbine vanes to a calibrated position (if the turbine is a VGT device).

In step 180, once the airflow demand is met, the ECU 94 returns to steady-state control of the air handling system.

Figure 8:
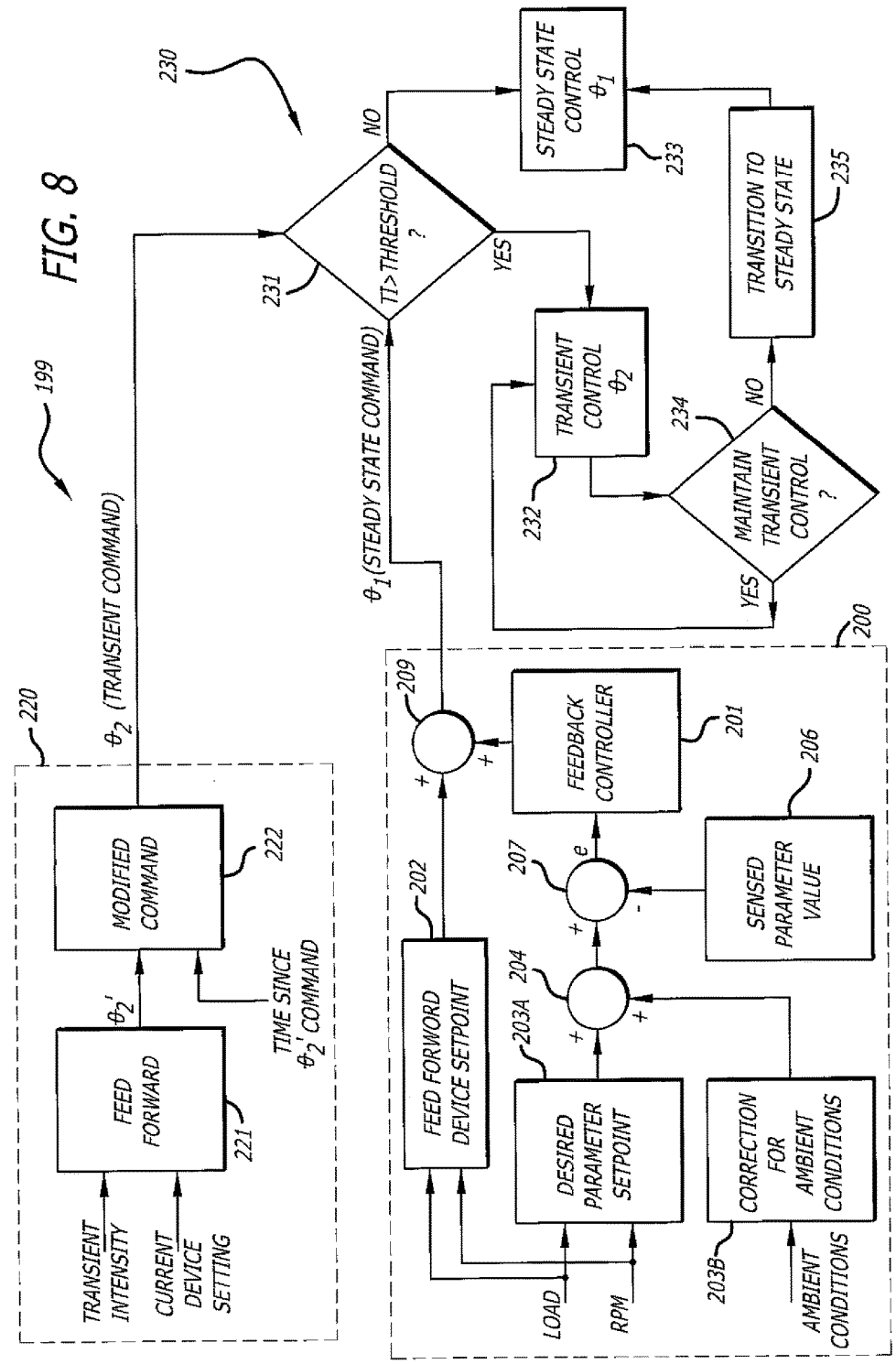
FIG. 8 shows a process for controlling active airflow devices of the air handling system of FIG. 3 during steady state and transient modes of engine operation.

The ECU 94 executes the air handling algorithms illustrated in FIGS. 5-7 using various configurations of a device control process 199 illustrated by the schematic diagram of FIG. 8. In this regard, the ECU executes respective adaptations of the device control process for a plurality of active airflow devices comprising the backpressure valve 90, the supercharger shunt valve 82, the supercharger drive 95, the wastegate valve 92 (for a fixed geometry turbine), the turbine vanes (for a VGT device), and possibly other active airflow devices. In each case, the respective device control process comprises a steady state control portion 200 operable to control the active airflow device in a steady state mode of engine operation by means of a steady-state command $\theta_1$, a transient control portion 220 operable to control the active airflow device in a transient mode of engine operation by means of a transient command $\theta_2$, and a transition portion 230. The transition portion 230 is operable to initiate steady state control by default and to transition control of the device to transient control at the point when an onset of a transient condition is detected. The transition portion 230 monitors various parameters during the transient condition in order to determine when to transition control of the device from transient control to steady state control. In each device control process, the steady state control portion 200 and the transient control portion 220 run simultaneously. Thus, at the points of transition there is no delay in formulating the appropriate command.

In each device control process, the steady state control portion 200 includes a feedback controller 201 and a feedforward controller device 202. The feedback controller 201 receives engine speed and engine load command-based control variables that are output as desired air parameter set-points (mass airflow, boost pressure, exhaust back-pressure, etc.) from a map or look-up table 203A indexed by engine load and engine speed (RPM) parameter values. A desired parameter set-point for current values of engine speed and current engine load is corrected at 204 for ambient condition factors that are output from a map or look-up table 203B indexed by ambient conditions. A parameter value of the corresponding component of actual airflow (mass airflow, boost pressure, exhaust back-pressure, etc.) in the air handling system is sensed (which may include measurement, estimation, or calculation) at 206 and an error value (e) is determined at 207 by subtracting the sensed parameter value from the desired set-point. The error value is input to the feedback controller 201, which generates a device set-point correction (c). The feedforward controller device 202 generates device actuator position commands in response to engine speed and engine load parameter values. The output of the feedback controller 201 and the output of the feedforward device controller 202 are added at 209 to generate a steady state device actuator command e, output by the ECU 94 to a device actuator.

The transient control portion 220 includes a feedforward device controller 221 that generates a transient device actuator command in response to the level of transient intensity or the rate of change of AFR resulting from the change in amount of fuel being injected. Using the transient intensity and the current position of an active actuator (valve, supercharger drive, VGT), a feedforward actuator command, $\theta_2'$, is generated. This command can be modified (or gated) at 222 on the basis of a elapsed time (obtained from a counter not shown) since the transient has been detected, thereby resulting in a final device actuator command ($\theta_2$) from transient controller 220.

By way of the transition portion 230, the ECU 94 changes control from steady state to transient if transient intensity is greater than a calibration value. The ECU 94 changes control from transient to steady state if either the elapsed time exceeds a limit, or the error value e drops below a calibration value level. Thus, at decision step 231, the ECU 94 tests the transient intensity level against the transient intensity calibration threshold value. When the test indicates the positive exit from decision step 231, the ECU 94, in step 232, enables transient control of the air handling system and issues the transient device actuator command $\theta_2$ to the active device. Otherwise, following the negative exit from decision step 231, the ECU 94, in step 233, issues the steady-state device actuator command, $\theta_1$. In decision step 234, if a transient device actuator command has been active for a calibration period, or if the air-handling set-points (mass airflow, boost, exhaust back-pressure, etc.) are met (e<calibration value), then the control process transitions via step 235 to steady-state control and issues a steady state device actuator command, $\theta_1$. If the air-handling set-points are not met after elapse of a calibration period, and the error between set-point and measured value is not changing, then the ECU 94 may raise an under-performance on-board diagnostic (OBD) fault via an OBD indicator 300 (seen in FIG. 4) during the transition 235 to steady state control.

In view of the examples and embodiments described in connection with FIGS. 3-8, several airflow control combinations have been described for a uniflow-scavenged, two-stroke cycle, opposed-piston engine 8 equipped with at least one cylinder 10 with a bore 12 and axially-spaced exhaust and intake ports 16 and 14 that communicate with the bore, a pair of pistons 22 and 20 disposed in opposition in the bore and operative to open and close the exhaust and intake ports during operation of the engine, an air handling system 15 that includes a charge air subsystem 38 to provide charge air to the intake port, an exhaust subsystem 40 to receive exhaust gas from the exhaust port, and a supercharger 60 that is operable to pump charge air in the charge air subsystem.

According to this specification, and with reference to FIGS. 4, 5, and 6, a first airflow control combination includes a command-controlled shunt valve 82 which promotes a charge air pressure ratio across the supercharger, a sensor 96 or 97 that senses one of engine acceleration and engine load of the engine, a sensor 103 that detects charge air pressure at the intake of the supercharger, a sensor 104 that detects charge air pressure at the outlet of the supercharger, and, a programmed control unit 94. The control unit is programmed to determine the occurrence of a torque demand for the engine, the torque demand having an intensity based on an intensity of a rate of change of engine acceleration or engine load with respect to a transient intensity threshold value (step 124), produce a transient command for the shunt valve to increase the charge air pressure ratio across the supercharger when the intensity of the torque demand exceeds the transient intensity threshold (step 154), and produce a steady state command to control the charge air pressure ratio across the supercharger to a desired setpoint when the intensity of the torque demand falls below the transient intensity threshold (step 160).

According to this specification, and with reference to FIGS. 4, 5, and 7, a second airflow control combination includes a command-controlled supercharger drive 95 which promotes a charge air pressure ratio across the supercharger, a sensor 96 or 97 that senses one of engine acceleration and engine load of the engine, a sensor 103 that detects charge air pressure at the intake of the supercharger, a sensor 104 that detects charge air pressure at the outlet of the supercharger, and, a programmed control unit 94. The control unit is programmed to determine the occurrence of a torque demand for the engine, the torque demand having an intensity based on an intensity of a rate of change of engine acceleration or engine load with respect to a transient intensity threshold value (step 124), produce a transient command for the supercharger drive to increase the charge air pressure ratio across the supercharger when the intensity of the torque demand exceeds the transient intensity threshold (step 154), and produce a steady state command to control the charge air pressure ratio across the supercharger to a desired setpoint when the intensity of the torque demand falls below the transient intensity threshold (step 160).

As will be evident to the reasonably skilled craftsman, the principles of transient air handling control set forth herein may be practiced in various control configurations of the air handling system of a uniflow-scavanged, two-stroke cycle, opposed-piston engine. For example, transient control of the air handling system may be bidirectional. That is to say transient control may occur in response to low-load to high-load transitions that exceed a threshold positive rate of change (as presented and described hereinabove), and also may occur in response to high-load to low-load transitions that exceed a threshold negative rate of change. Further, the air handling system may be configured with a supercharger alone or a turbocharger alone, as well as the supercharger/turbocharger examples described above. Therefore, although control of airflow and fuel flow in a uniflow-scavanged, two-stroke cycle, opposed-piston engine during transient operation has been described with reference to presently preferred examples and embodiments, it should be understood that various modifications can be made without departing from the scope of the following claims.

The invention claimed is:

1. A method of controlling a uniflow-scavanged, two-stroke cycle, opposed-piston engine, comprising:
   monitoring a transient indication parameter of the engine;
   determining, based on the transient indication parameter, whether the engine is in a transient mode of operation;
   when the engine is in a transient state of operation:
      controlling fuel injection into cylinders of the engine by changing one or more of a common-rail pressure and a fuel injection duration;
      controlling unidirectional airflow through the cylinders of the engine by increasing a scavenging ratio of the engine or by increasing a trapping efficiency of the engine;
      determining when the transient state of operation ends; and,
   transitioning the engine to a steady state of operation; otherwise, operating the engine in a steady state of operation when the engine is not in a transient state of operation.

2. The method of claim 1, wherein the transient indication parameter comprises an accelerator position.

3. The method of claim 1, wherein controlling unidirectional airflow through the cylinders of the engine comprises changing one or more of a supercharger shunt valve setting, a supercharger drive ratio setting, and a turbine vane setting.

4. The method of claim 1, wherein increasing the scavenging ratio of the engine comprises:
   decreasing an exhaust backpressure of the engine; and,
   increasing a velocity of unidirectional airflow through the cylinders of the engine.

5. The method of claim 4, wherein increasing the scavenging ratio of the engine further comprises, after increasing the scavenge ratio for a calibration period, increasing a compressor outlet pressure of the engine.

6. The method of claim 1, wherein increasing the trapping efficiency of the engine comprises:
   decreasing an exhaust backpressure of the engine;
   increasing a velocity of unidirectional airflow through the cylinders of the engine; and,
   increasing a compressor outlet pressure of the engine.

7. The method of claim 6, wherein increasing the trapping efficiency of the engine further comprises, after increasing the trapping efficiency for a calibration period, reducing a compressor outlet pressure of the engine.

8. The method of claim 1, wherein the engine comprises active air handling devices including at least one valve, a supercharger drive, and a variable geometry turbine, and transitioning the engine to the steady state of operation comprises issuing a transient command $\theta_2$ for an actuator of at least one air handling device from an engine control unit (ECU), monitoring an elapse of time from when the transient command $\theta_2$ was issued, and transitioning the engine to the steady state of operation in response to an elapse of a calibration time.

9. The method of claim 8, wherein the engine comprises a steady state control process in which an airflow parameter comprising one of mass airflow, boost pressure, exhaust and back-pressure in the air handling system is sensed and an error value is determined by subtracting the sensed parameter value from a desired set-point value for the airflow parameter, and transitioning the engine to the steady state of operation comprises transitioning the engine to the steady state of operation when:
   an elapse of a calibration time occurs; or,
   the error value is less than a calibration value.

10. The method of claim 9, wherein controlling unidirectional airflow through cylinders of the engine comprises changing one or more of a supercharger shunt valve setting, a supercharger drive ratio setting, and a turbine vane setting.

11. A method of controlling an air handling system of a uniflow-scavanged, two-stroke cycle, opposed-piston engine equipped with at least one cylinder with a bore and axially-spaced exhaust and intake ports that communicate with the bore, a pair of pistons disposed in opposition in the bore and operative to open and close the exhaust and intake ports during operation of the engine, the air handling system including a charge air subsystem to provide charge air to the intake port, an exhaust subsystem to receive exhaust gas from the exhaust port, and a supercharger operable to pump charge air in the charge air subsystem, the method comprising:
   monitoring a transient indication parameter of the engine;

determining, based on the transient indication parameter, whether the engine is in a transient state of operation;

when the engine is in a transient state of operation:
- at an onset of the transient state of operation, opening a backpressure valve in the exhaust subsystem to reduce backpressure resistance to airflow through the air handling system;
- at the onset of the transient state of operation, controlling unidirectional airflow through cylinders of the engine by changing a supercharger shunt valve setting to increase a supercharger pressure ratio of the engine or by changing a supercharger drive ratio setting to increase the supercharger pressure ratio of the engine;
- determining when the transient state of operation ends; and
- then, transitioning the engine to a steady state of operation;

otherwise, operating the engine in the steady state of operation if the engine is not in the transient state of operation.

12. The method of claim 11, wherein the transient indication parameter comprises an accelerator position or an engine load.

13. The method of claim 11, wherein the engine further includes a turbocharger with a turbine in the exhaust subsystem and a compressor in the charge air subsystem, upstream of the supercharger, and controlling unidirectional airflow through cylinders of the engine further comprises one or more of decreasing an exhaust backpressure of the air handling system, and increasing a compressor outlet pressure of the air handling system.

14. An airflow control combination for a uniflow-scavenged, two-stroke cycle, opposed-piston engine equipped with at least one cylinder with a bore and axially-spaced exhaust and intake ports that communicate with the bore, a pair of pistons disposed in opposition in the bore and operative to open and close the exhaust and intake ports during operation of the engine, and an air handling system including a charge air subsystem to provide charge air to the intake port, an exhaust subsystem to receive exhaust gas from the exhaust port, a supercharger operable to pump charge air in the charge air subsystem, and a command-controlled shunt valve which promotes a charge air pressure ratio across the supercharger, the airflow control combination comprising:
- a sensor that senses one of engine acceleration and engine load of the engine;
- a sensor that detects charge air pressure at the intake of the supercharger;
- a sensor that detects charge air pressure at the outlet of the supercharger, and,
- a control unit programmed to:
  - determine an occurrence of a torque demand for the engine, the torque demand having an intensity based on an intensity of a rate of change of engine acceleration or engine load with respect to a transient intensity threshold value;
  - produce a transient command for the shunt valve to increase a charge air pressure ratio across the supercharger when the intensity of the torque demand exceeds the transient intensity threshold; and
  - produce a steady state command to control the charge air pressure ratio across the supercharger to a desired setpoint when the intensity of the torque demand falls below the transient intensity threshold.

15. The airflow control combination of claim 14, further comprising a backpressure valve in the exhaust subsystem to control a backpressure in the air handling system, in which the control unit is further programmed to produce a transient command to open the backpressure valve when the intensity of the torque demand exceeds the transient intensity threshold.

16. An airflow control combination for a uniflow-scavenged, two-stroke cycle, opposed-piston engine equipped with at least one cylinder with a bore and axially-spaced exhaust and intake ports that communicate with the bore, a pair of pistons disposed in opposition in the bore and operative to open and close the exhaust and intake ports during operation of the engine, a charge air channel to provide charge air to the intake port, an exhaust channel to receive exhaust gas from the exhaust port, a supercharger operable to pump charge air in the charge air channel, and a command-controlled supercharger drive which promotes a charge air pressure ratio across the supercharger, the airflow control combination comprising:
- a sensor that senses one of engine acceleration and engine load of the engine;
- a sensor that detects charge air pressure at the intake of the supercharger;
- a sensor that detects charge air pressure at the outlet of the supercharger and,
- a control unit programmed to:
  - determine the occurrence of a torque demand for the engine, the torque demand having an intensity based on an intensity of a rate of change of engine acceleration or engine load with respect to a transient intensity threshold value;
  - produce a transient command to actuate the supercharger drive to increase the charge air pressure ratio across the supercharger when the intensity of the torque demand exceeds the transient intensity threshold; and
  - produce a steady state command to control the charge air pressure ratio across the supercharger to a desired setpoint when the intensity of the torque demand falls below the transient intensity threshold.

17. The airflow control combination of claim 16, further comprising a backpressure valve in the exhaust channel to control a backpressure in the air handling system, in which the control unit is further programmed to produce a transient command to open the backpressure valve when the intensity of the torque demand exceeds the transient intensity threshold.

18. A control process executable by a programmed control unit of a uniflow-scavenged, two-stroke cycle, opposed-piston engine equipped with one or more cylinders, each cylinder having a bore and axially-spaced exhaust and intake ports that communicate with the bore, a pair of pistons disposed in opposition in the bore and operative to open and close the exhaust and intake ports during operation of the engine, an air handling system of the engine including a charge air subsystem to provide charge air to the intake ports, an exhaust subsystem to receive exhaust gas from the exhaust ports, and a plurality of command-controlled air flow devices positioned in the charge air and exhaust subsystems to establish and sustain a unidirectional flow of gas through the cylinders, in which the control process comprises:
- controlling at least one of the plurality of command-controlled airflow devices in a steady state mode of engine operation with a steady-state command $\theta_1$;

controlling the at least one of the plurality of command-controlled airflow devices in a transient mode of engine operation with a transient command $\theta_2$; and, initiating the steady state control mode by issuing the steady-state command $\theta_1$, and transitioning control of the at least one of the plurality of command-controlled airflow devices to the transient control mode by issuing the transient command $\theta_2$ when an onset of a transient condition of the engine is detected by the programmed control unit.

19. The control process of claim 18, in which the control process further comprises determining when to transition control of the at least one of the plurality of command-controlled airflow devices from the transient control mode to the steady state control mode.

20. The control process of claim 19, in which the controlling the at least one of the command-controlled plurality of airflow devices in a steady state mode comprises generating a set-point correction value (c) to correct a current position of the at least one of the plurality of command-controlled airflow devices, generating a device position command, and adding the set-point correction value (c) and the device position command to generate the steady state command $\theta_1$.

21. The control process of claim 20, in which controlling the at least one of the plurality of command-controlled airflow devices in a transient mode of engine operation comprises generating a transient command $\theta_2'$ in response to a level of transient intensity or a rate of change of air/fuel ratio (AFR), and providing, via a gate, the final transient command $\theta_2$ on the basis of elapsed time since the transient condition has been detected.

22. The control process of claim 21, in which controlling the at least one of the plurality of command-controlled airflow devices is changed from the transient control mode to steady state control mode when either the transient command $\theta_2'$ has been active for a calibration time, or when an error value (e) representing a difference between a desired set-point of an airflow parameter and a sensed value of the airflow parameter is less than a calibration value.

23. The control process of claim 22, in which the control process further comprises generating an on-board diagnostic (OBD) fault when the error value (e) is greater than the calibration value after a calibration time, and is not changing.

24. The control process of claim 19, in which the plurality of command-controlled airflow devices comprises a supercharger shunt valve of the air handling system, a supercharger drive of the air handling system, a variable geometry turbine of the air handling system, an exhaust backpressure valve of the air handling system, and a wastegate valve of the air handling system.

* * * * *

UNITED STATES PATENT AND TRADEMARK OFFICE
CERTIFICATE OF CORRECTION

PATENT NO. : 10,161,345 B2
APPLICATION NO. : 15/173478
DATED : December 25, 2018
INVENTOR(S) : Arunandan Sharma et al.

Page 1 of 1

It is certified that error appears in the above-identified patent and that said Letters Patent is hereby corrected as shown below:

In the Claims

-- Column 13, Line 56, Claim 1 delete "in a transient mode" and replace with "in a transient state"

-- Column 13, Line 57, Claim 1 delete "in a transient state" and replace with "in the transient state"

-- Column 14, Line 18, Claim 5 delete "the scavenge ratio" and replace with "the scavenging ratio"

-- Column 15, Line 21, Claim 11 delete "if the engine" and replace with "when the engine"

Signed and Sealed this
Twelfth Day of February, 2019

Andrei Iancu
*Director of the United States Patent and Trademark Office*